United States Patent Office 2,855,104
Patented Oct. 7, 1958

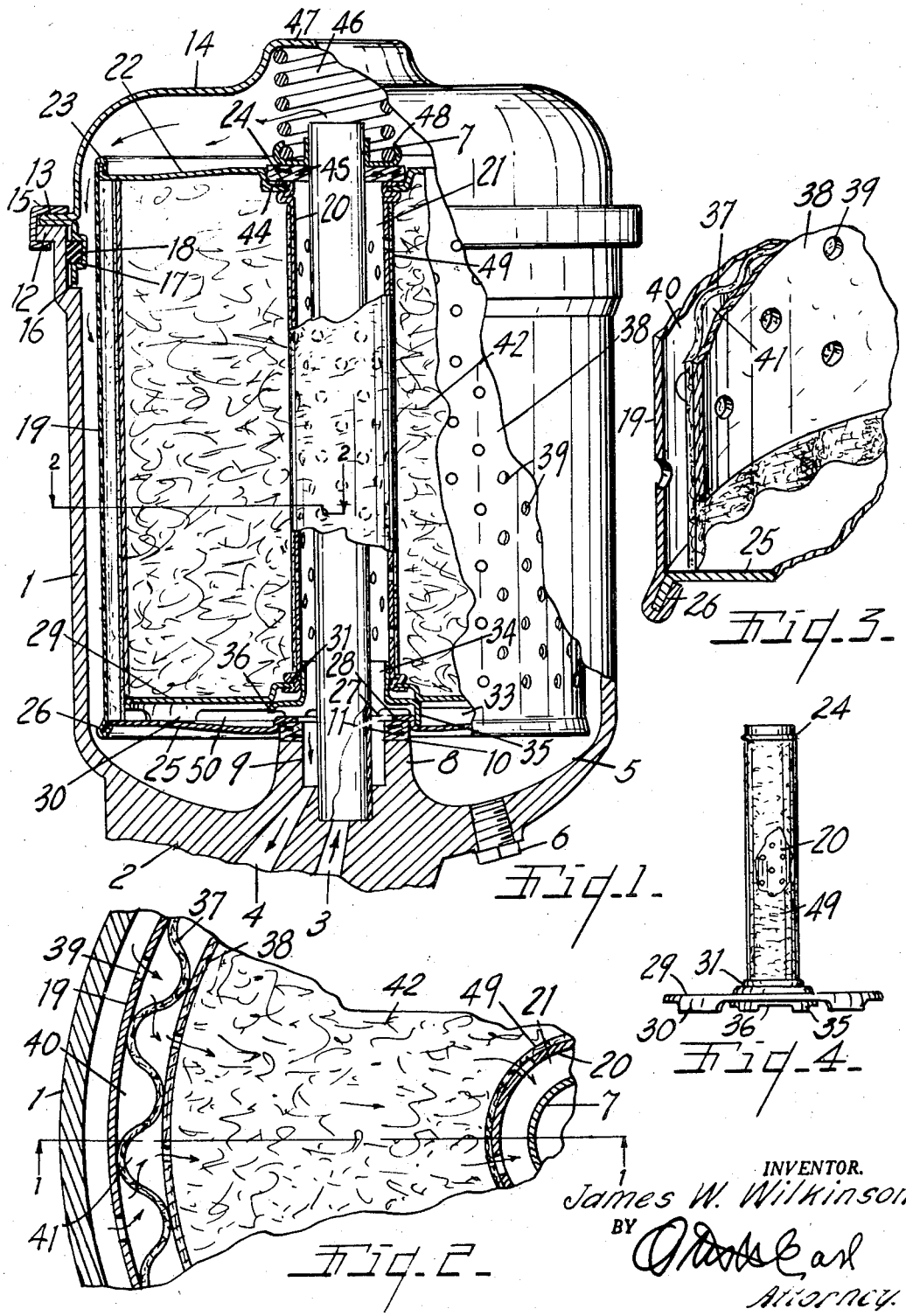

2,855,104
FILTER

James W. Wilkinson, Hastings, Mich., assignor to Hastings Manufacturing Company, Hastings, Mich.

Application November 30, 1956, Serial No. 625,447

6 Claims. (Cl. 210—315)

This invention relates to filters adapted for the filtering of lubricating oil of internal combustion engines which is circulated through the filter under substantial pressure.

The main objects of this invention are:

First, to provide a filter generally designated as free flow type which provides for a relatively free flow of a minor portion of the circulated lubricant which by-passes the main filtering medium at the same time securing an effective filtering of the major portion of the circulating lubricant.

Second, to provide a filter structure having these advantages in which the filtered material is very uniformly distributed to the filtering mass.

Third, to provide a filter having these advantages in which the filtering cartridge may be quickly installed in a housing or casing and removed therefrom as occasion requires and an effective seal is provided for the circulated liquid to insure its circulation through the filter cartridge.

Objects relating to details and economies of the invention will appear from the description to follow. The invention is defined and pointed out in the claims.

A preferred embodiment of the invention is illustrated in the accompanying drawing, in which:

Fig. 1 is a fragmentary view partially in vertical section on a line corresponding to line 1—1 of Fig. 2.

Fig. 2 is an enlarged fragmentary horizontal section on a line corresponding to line 2—2 of Fig. 1.

Fig. 3 is a fragmentary perspective view partially in vertical section on a line corresponding to the vertical section of Fig. 1, illustrating details and the relation of certain of the parts.

Fig. 4 is a side elevational view with parts broken away of the inner upright filter chamber wall member and the inner bottom member of the filter chamber.

In the embodiment illustrated the casing comprises a body member 1, the bottom 2 having an inlet passage 3 and outlet passage 4 therein. The bottom is conformed to provide a sump 5 having a drain opening 6. The inlet tube 7 is mounted centrally on the bottom to deliver or discharge at the upper end of the casing.

The bottom is provided with an annular centrally raised portion 8 which with the tube defines the annular discharge 9 opening to the outlet or discharge 4. The upper edge of the part 8 provides a seat 10 for the gasket 11. The body member 1 is provided with an outturned flange 12 at its upper edge on which the flange 13 of the casing top member or cover 14 is seated, the top member being secured by the coupling 15, details of which are not illustrated as they form no part of this invention.

The top member 14 is provided with a skirt 16 telescoping within the body member and provided with an outwardly facing gasket seat 17 for the gasket 18 which provides a seal between the body member and the top.

The filter cartridge comprises the outer upright outer side wall 19 and the inner upright wall 20 which is spaced from the inlet tube to provide a discharge 21 opening to the outlet. The top wall 22 is seamed or otherwise connected to the outer wall 19 at 23 and to the inner wall 20 at 24. Both the outer and the inner upright walls are foraminate. The top wall is imperforate as is also the outer bottom wall 25. The bottom wall 25 is seamed to the bottom of the outer side wall 19 at 26 and has a discharge opening 27 therein provided with a downwardly facing seat 28 for the gasket 11.

The imperforate inner bottom member 29 has a downturned flange 30 at its outer edge seated upon the outer bottom wall and provided with openings 50 at its inner edge. The inner bottom member is seamed to the inner upright wall 20 at 31. The outer and inner bottom members are spaced to provide a discharge header 33.

The extension 34 at the bottom of the inner wall has an outwardly offset lower portion 35 with discharge openings 36 therein for the discharge header.

The vertically corrugated filtering member 37 is disposed within the outer wall 19 in supported relation thereto with its lower end resting upon the outer bottom member in embracing relation to the flange 30 of the inner bottom member. This filtering member is desirably formed of fiberboard like material through which the liquid filters quite rapidly.

In the embodiment illustrated the inner foraminate side wall 38 has a plurality of uniformly distributed openings 39 therein. It is however desirably of felted fibrous material so that the filtered liquid may pass therethrough. The outer wall 19, inner wall 39 and the corrugated filtering member 37 form an annular series of outer channels 40 and an annular series of inner channels 41, both serving to provide a very uniform distribution of the filtered liquid to the filtering material. The outer channels connect with the discharge header through this corrugated member.

The inner wall, inner side wall, top wall and the inner bottom members define a chamber for the fibrous filter material 42 which is desirably of cotton linters having their full wax content. This filter material does not settle as it is resilient and it does not become waterlogged.

The top wall is provided with a gasket seat 44 for the gasket 45 which is in sealing engagement with the inlet tube. This gasket is urged to its seat and the cartridge is urged against the gasket 11 by means of the coil spring 46 seated in the embossment 47 of the top member and in thrust engagement with the collar 48 which rests upon the top gasket 45 and is sleeved over the inlet tube so that the cartridge is properly held in its relation to the inlet tube and to the casing. The inner wall is desirably provided with a covering sheet 49 of felted fibrous material which serves the double purpose of a filter element and also prevents the fibrous filter material from entering and clogging the holes in the inner wall.

I have illustrated and described my invention in a highly practical embodiment thereof. I have not attempted to illustrate certain modifications or adaptations which I contemplate as it is believed that this disclosure will enable those skilled in the art to embody or adapt the invention as may be desired.

Having thus described the invention, what is claimed as new and is desired to be secured by Letters Patent is:

1. In a filter, the combination of a casing comprising a body member open at its upper end, a top member detachably mounted on said body member, said body member including a bottom provided with inlet and outlet openings, an inlet tube mounted on the bottom of said casing in communication with said inlet passage and discharging at the top of the casing, said bottom having an annular upwardly facing gasket seat spaced from said tube, a gasket arranged on said seat, a filtering cartridge removably positioned in said casing and comprising an outer upright foraminate side wall and an inner upright foraminate wall surrounding and spaced from said inlet tube to provide an outlet passage opening within said gasket to said outlet in said bottom, an imperforate outer bottom wall having an opening therein surrounding said inlet tube and provided with a downwardly facing seat for said gasket, an imperforate inner bottom member connected at its inner edge to the lower end of said inner upright wall and spaced from said outer bottom wall and coacting therewith to provide a discharge header, an imperforate top wall connected to said outer and inner upright walls, a vertically corrugated filter member disposed within said outer side wall in supported relation thereto, an inner foraminate side wall disposed on the inner side of said corrugated member, said outer side wall, inner side wall and corrugated member defining annular series of inner and outer vertical channels, the outer channels being in communication with said discharge header through said corrugated member, said inner side wall, inner wall, inner bottom member and said top wall defining a filtering medium chamber having a compacted fibrous filtering material therein, said top wall having an upwardly facing gasket seat surrounding said inlet tube, a second gasket disposed on said seat in sealing relation to said inlet tube, a thrust collar sleeved upon said inlet tube in supported relation to said second gasket, and a coil spring disposed in supported relation in said casing top member and in thrust engagement with said thrust collar.

2. In a filter, the combination of a casing including a bottom provided with inlet and outlet openings, an inlet tube mounted on the bottom of said casing in communication with said inlet passage and discharging at the top of the casing, said bottom having an annular upwardly facing gasket seat spaced from said tube, a first gasket arranged on said seat, a filtering cartridge removably positioned in said casing and comprising an outer upright foraminate side wall and an inner upright foraminate wall surrounding and spaced from said inlet tube to provide an outlet passage opening within said gasket to said outlet in said bottom, an imperforate outer bottom wall having an opening therein surrounding said inlet tube and provided with a downwardly facing seat for said gasket, an inner bottom member connected at its inner edge to the lower end of said inner upright wall and spaced from said outer bottom wall and coacting therewith to provide a discharge header, a top wall connected to said outer and inner upright walls, a vertically corrugated filter member disposed within said outer side wall in supported relation thereto, an inner foraminate side wall disposed on the inner side of said corrugated member, said outer side wall, inner side wall and corrugated member defining annular series of inner and outer vertical channels, the outer channels being in restricted flow communication with said discharge header, said inner side wall, inner wall, inner bottom member and said top wall defining a filtering medium chamber having a compacted fibrous filtering material therein, said top wall having an upwardly facing gasket seat surrounding said inlet tube, a second gasket disposed on said seat in sealing relation to said inlet tube, and means for applying downward thrust to said second gasket and through it to said cartridge to bias it against said first gasket.

3. In a filter, the combination of a casing including a bottom provided with inlet and outlet openings, an inlet tube mounted on the bottom of said casing in communication with said inlet passage and discharging at the top of the casing, said bottom having an annular upwardly facing gasket seat spaced from said tube, a first gasket arranged on said seat, a filtering cartridge having a filtering medium chamber therein containing compacted fibrous material removably positioned in said casing in surrounding relation to said inlet tube and comprising an outer upright foraminate side wall and an inner upright foraminate wall surrounding and spaced from said inlet tube to provide an outlet passage opening within said gasket to said outlet in said bottom, an imperforate outer bottom wall having an opening therein surrounding said inlet tube and provided with a downwardly facing seat for said gasket, an inner bottom member connected at its inner edge to the lower end of said inner upright wall and spaced from said outer bottom wall and coacting therewith to provide a discharge header, an imperforate top wall connected to said outer and inner upright walls, a filtering member disposed within said outer wall and coacting therewith to provide a restricted flow connection for the filtered material to said outlet header, said top wall having an upwardly facing gasket seat surrounding said inlet tube, a second gasket disposed on said seat in sealing relation to the inlet tube, and means for applying thrust to said second gasket to bias it against the seat and to bias said cartridge against said first named gasket.

4. In a filter, the combination of a casing including a bottom provided with inlet and outlet openings, an inlet tube mounted on the bottom of said casing in communication with said inlet passage and discharging at the top of the casing, said casing bottom having an annular upwardly facing gasket seat spaced from said tube, a first gasket arranged on said seat, a filtering cartridge having a filtering medium chamber therein containing compacted fibrous material removably positioned in said casing in surrounding relation to said inlet tube and including an inner foraminate upright wall concentric with and spaced from said inlet tube to provide an outlet for the filter cartridge and having an outlet through said gasket, said cartridge comprising an imperforate outer bottom wall having an opening therein surrounding said inlet tube and provided with a downwardly facing seat for said gasket, an inner bottom wall constituting a bottom for said filtering medium chamber spaced from said outer bottom wall and connected to the lower end of said inner upright wall of said filtering medium chamber, a top wall, said top wall having an upwardly facing gasket seat surrounding said inlet tube, a second gasket disposed on said gasket seat of said top wall in sealing relation to the inlet tube, and means for applying downward thrust to said second gasket to bias it against its seat and to bias said cartridge against said first named gasket.

5. A filter cartridge comprising an outer foraminate side wall and an inner foraminate wall, said walls being disposed in radially spaced concentric relation, an imperforate outer bottom wall having a central outlet opening therein, an imperforate inner bottom member connected at its inner edge to said inner foraminate wall and spaced from said outer bottom wall and coacting therewith to provide a discharge header, a top wall, a vertically corrugated filter member disposed within said outer side wall in supported relation thereto and with its lower end in engagement with said bottom, an inner flow distributing side wall disposed on the inner side of said corrugated member, said outer side wall, inner side wall and corrugated member defining an annular series of inner and outer vertical channels, the outer channels being in communication with said discharge header through said corrugated filter member below said inner bottom member, said inner side wall, inner wall, inner bottom member and said top walls defining a filter medium chamber having a compacted fibrous filtering material therein.

6. A filter cartridge comprising an outer foraminate side wall and an inner foraminate wall, said walls being disposed in radially spaced concentric relation, an imperforate outer bottom wall having a central outlet opening therein, an imperforate inner bottom member connected at its inner edge to said inner foraminate wall and spaced from said outer bottom wall and coacting therewith to provide a discharge header, an imperforate top wall, a vertically corrugated filter member disposed within said outer side wall in supported relation thereto, an inner foraminate side wall disposed on the inner side of said corrugated member, said outer side wall and corrugated member defining an annular series of inner and outer vertical channels, the outer channels being in communication with said discharge header through said corrugated filter member, said inner side wall, inner wall, inner bottom member and said top walls defining a filter medium chamber having a compacted fibrous filtering material therein.

References Cited in the file of this patent
UNITED STATES PATENTS 2,750,042 Wilkinson _____ June 12, 1956